United States Patent
Drobyshev et al.

(10) Patent No.: US 7,403,863 B2
(45) Date of Patent: Jul. 22, 2008

(54) CORRELATION METHOD FOR MEASUREMENTS OF TOTAL AND FRACTIONAL IMMISCIBLE MEDIA FLOW RATES AND A DEVICE FOR ITS EMBODIMENT

(75) Inventors: Andrey Drobyshev, Oktyabrya (RU); Felix Kashin, Bazhova (RU); Inna Kashina, Bazhova (RU); Irina Kashina, Bazhova (RU); Sergey Saraev, Yaroslavskoe shosse (RU); Sergey Lastochkin, Menzhinskogo (RU)

(73) Assignee: Sinergia Technologies, Inc., New York, NY (US)

( * ) Notice: Subject to any disclaimer, the term of this patent is extended or adjusted under 35 U.S.C. 154(b) by 0 days.

(21) Appl. No.: 11/724,345

(22) Filed: Mar. 15, 2007

(65) Prior Publication Data
US 2007/0185662 A1 Aug. 9, 2007

Related U.S. Application Data

(63) Continuation of application No. 11/184,241, filed on Jul. 19, 2005, now abandoned.

(51) Int. Cl.
*G01F 1/00* (2006.01)
(52) U.S. Cl. .................. 702/45; 73/61.52; 324/640
(58) Field of Classification Search .............. 702/45, 702/50–53, 100, 114; 73/861.04, 861.24, 73/861.27, 861.28, 861.29, 61.52; 324/640
See application file for complete search history.

(56) References Cited

U.S. PATENT DOCUMENTS 4,902,961 A * 2/1990 De et al. ............. 324/640
2003/0000291 A1 * 1/2003 Kolosov et al. ........ 73/61.52

* cited by examiner

*Primary Examiner*—John E. Barlow, Jr.
*Assistant Examiner*—John H Le
(74) *Attorney, Agent, or Firm*—Gottlieb, Rackman & Reisman P.C.

(57) ABSTRACT

A correlation method for measuring total and fractional flow rates of multiphase immiscible media comprises identifying two control sections along the multiphase flow, and scanning each control section so as to measure fluctuations in the dielectric flow characteristics in each section, the scanning signals for each section comprising rotating high-frequency electric and magnetic fields with one common carrier frequency. The received scanning signals are independently processed so as to identify the peak amplitude-frequency and gain-phase characteristics of the signals, and the results of all measurements are used for calculating the correlation functions. The scanning signals generated by the rotating high-frequency electric field are amplified by means of a normalizing scale factor, and all four scanning signals are additionally processed by a microprocessor. Total and factional flow rates are determined by comparing the measured characteristics with reference characteristics stored in a database. The method disclosed is useful in the oil-producing and oil-processing industries, particularly for evaluation of oil well production rates.

28 Claims, 4 Drawing Sheets

Correlation Method...

109 - scanning signals generator
115,116,117,118 - analog-digital converters
111 - time delay unit
119,120 - units for calculating the correlation function
122 - unit for the storage of reference characteristics
110,112 - time shift units
121 - scaling unit
124 - external computer Correlation Method...

109 - scanning signals generator
113,114,115,116 - analog-digital converters
123,124 - time delay units
117,118 - units for calculating the correlation function
120 - unit for the storage of reference characteristics 110 - time shift unit
119 - scaling unit
122 - external computer

Correlation Method...

109 - scanning signals generator
113,114,115,116 - analog-digital converters
123,124 - time delay units
117,118 - units for calculating the correlation function
120 - unit for the storage of reference characteristics
130 - time shift unit
119 - scaling unit
122 - external computer

CORRELATION METHOD FOR MEASUREMENTS OF TOTAL AND FRACTIONAL IMMISCIBLE MEDIA FLOW RATES AND A DEVICE FOR ITS EMBODIMENT

This application is a continuation of U.S. Patent application Ser. No. 11/184,241, filed Jul. 19, 2005 now abandoned, the content of which is incorporated herein by reference.

FIELD OF THE INVENTION

The invention relates to measuring equipment and can be used in data-measuring systems in oil-producing and oil-processing industries for the determination of multiphase flow composition, in particular, for evaluation of the well production rate, as well as in other production processes when there is a need for measurements of multiphase technological media flow rates.

BACKGROUND OF THE INVENTION

The correlation measuring methods and devices for measurements of total and fractional immiscible media flow rates based on correlation measuring methods permit measurements of fluid media flow rates without blocking up a pipeline and without affecting its tightness. Therefore they are most preferable solutions for measurements of inflammable and highly explosive media.

The correlation flow rate measuring methods are based on the determination of the maximum value of the correlation function in the course of measuring flow fluctuations over two control cross-sections.

The correlation method for measurements of total and fractional immiscible multiphase media flow rates which was embodied in the device described in patent # 2194950, G01F 1/74, 1/712, G01N 22/04, 20 Dec. 2002 (issued in the Russian Federation) most closely resembles the claimed invention in terms of combined essential features. The known method comprises:
  identification of two control sections that are located on a pipeline at a fixed distance from each other;
  measurements of fluctuations of the flow dielectric characteristics in each control section with scanning of the flow by the rotating high-frequency electric field;
  processing scanning signal with identification of the area with the maximum gain-phase frequency or amplitude-frequency characteristics of the signal;
  recording the time of the flow transportation at the peak of the scanning signals' correlation function and determination of fractional composition of immiscible multiphase-media and total and fractional flow rates.

The known method permits the determination of the total flow rate and fractional composition of two immiscible media if dielectric characteristics of transported media drastically differ from each other. In particular, it is possible to determine water cut in the oil stream when evaluating the well production rate. However, if transported medium comprises gas as well, the measurement of gas volume fraction (GVF) is impossible. The known method does not either permit finding the presence of solid sediments on the pipeline walls, i.e. the presence of paraffin on the walls of the oil pipeline.

There is also a known device for measurements of electro-conductive two-phase media flow rate. Said device incorporates a measuring section with an AC magnetic system that has a magneto with two induction coils mounted on two opposite sides of the pipeline, two electrodes on the opposite walls of the pipeline and a control unit which comprises a unit for calculating the correlation function (ref. Inventor's Certificate # 901829, G01F 1/72, G01F 1/74, 30 Jan. 1982 issued in the USSR). The use of the magnetic field ensures a high level of the signal which significantly surpasses interferences, but said device can be used only for measurements of electrically conducting fluids. The performance of said device is good when measuring two-phase media, but it fails to identify fractions of each phase when their number increases.

There is also a known device for measurements of total and fractional flow rates of multiphase immiscible media that comprises a measuring section with two systems on the pipeline walls for scanning a pipeline by the high-frequency electromagnetic field on two different frequencies. Analyzing the received signals, it is possible to calculate the changes of complex dielectric characteristics of the medium (actual and imaginary parts of the complex dielectric constant), and thus to determine phases ratio in the flow (U.S. Pat. No. 4,902,961, NKI 324/640, 20 Feb. 1990). Said device provides a quite accurate determination of phases ratio of multiphase flows, including multiphase flows with dielectric fluids, although it cannot be used to determine fluid flow rate which would require an additional device.

The device described in patent # 2194950, G01F 1/74, 1/712, G01N 22/04, 20 Dec. 2002 issued in the Russian Federation most closely resembles the claimed invention in terms of combined essential features. The known device comprises:
  two measuring sections placed along a pipeline, each section equipped with a measuring unit for measurements of fluctuations of flow dielectric characteristics;
  high-frequency generator of scanning signals coupled to said measuring units;
  the first and the second units for measurements of gain-phase frequency or amplitude-frequency characteristics;
  a unit for calculating the correlation function and control microprocessor.

Each unit for measurements of fluctuations of dielectric field characteristics is coupled via its own first and second unit for measurements of gain-phase frequency or amplitude-frequency characteristics to a unit for calculating the correlation function. The performance of said device is wholly satisfactory when measuring total and fractional flow rates of immiscible two-phase fluids, including dielectric liquids. Said device is successfully used to determine water cut in the oil stream. However, with water fraction being an exception, said device fails to identify other phases when the number of phases increases, which limits its capabilities.

SUMMARY OF THE INVENTION

The claimed invention aims to develop a correlation method for measurements of total and fractional flow rates of multiphase immiscible media (including flows with three or more phases) and a device for its embodiment permitting measurements of fractional volumes of all phases that are present in the flow of immiscible media (gas, immiscible fluids, solid phase), as well as their flow rates.

To cope with this technical challenge, the claimed correlation method for measurements of total and fractional flow rates of multiphase immiscible media comprises:
  two control sections on a pipeline that are located at a fixed distance from each other;
  measurements of fluctuations of dielectric flow characteristics in each control section with scanning of the flow by the rotating high-frequency electric field;

processing scanning signal to identify the area with a peak amplitude-frequency characteristic of the scanning signal;

recording the time of the flow transportation at the peak of scanning signals' correlation function and determination of fractional volumes of multiphase immiscible media and total and fractional flow rates;

additional scanning of the multiphase flow in each control section by the rotating high-frequency magnetic field with one common carrier frequency of the signal;

processing scanning signals by the rotating high-frequency magnetic field with identification of the area with the peak gain-phase characteristic of the signals;

calculation of the correlation function by using all four scanning signals;

scaling the amplitude of scanning signals by the rotating high-frequency electric field or scaling the sum of the amplitudes of two said signals in the course of calculating the correlation function and aligning their signal in relation to the scanning signal generated by the rotating magnetic field.

At that high-frequency electric and magnetic signals with a adjustable carrier frequency of the signals in the 1-100 MHz range are used for the flow scanning.

Moreover, when scanning the flow, the carrier frequency of the scanning signal is altered stepwise and on each frequency the scanning signal is recorded in the fixed mode.

When changing-over to the next scanning frequency the carrier frequency of the scanning signal changes with a 50-150 Hz step.

Also, when scanning the flow by the high-frequency magnetic field, the scanning signal is fed with a time shift which equals the time it takes the medium to cover the distance between the control cross-sections scanned by the electric and magnetic fields.

While doing so, the time it takes the medium to cover the distance between two control sections is recorded and when further flow scanning is effected the scanning signals in the second control section are fed with a time delay which takes into account the transportation time of the medium.

Besides, in order to determine fractional composition of the multiphase medium the scaled amplitude-frequency characteristics of scanning by the electric and magnetic field are summed up; the composite characteristic is compared with the reference characteristics in the database. The database identifies most similar characteristics and fractional volumes of separate multiphase medium components are calculated by means of interpolation.

At the same time, resonance frequencies, phase shifts, actual and imaginary parts of the complex dielectric constant, actual and imaginary parts of magnetic losses are calculated by using recorded amplitude-frequency characteristics. The obtained values are compared with the reference characteristics in the database. The database identifies most similar combinations of specified characteristics and fractional composition of separate components of the multiphase medium is calculated by using interpolation.

Besides, the temperature and pressure of the multiphase medium are additionally measured at least in one control section.

With regard to the first embodiment of the claimed invention the device for measurements of total and fractional flow rates of multiphase immiscible media comprises:

two measuring sections that are set apart from each other on a pipeline, each of these measuring sections being equipped with a unit for measurements of fluctuations of dielectric flow characteristics;

a high-frequency scanning signals generator coupled to said measuring units;

the first and the second units for measurements of amplitude-frequency characteristics;

a unit for calculating the correlation function and a control microprocessor.

Each unit for measurements of fluctuations of dielectric field characteristics is coupled to the unit for calculating the correlation function via their own first and second unit for measurements of amplitude-frequency characteristics. The claimed invention provides that each measuring section is additionally equipped with a unit for measurements of fluctuations of scanning magnetic field in the multiphase flow. Each measuring section comprises the third and the fourth units for measurements of amplitude-frequency characteristics, the second unit for calculating the correlation function, a unit for scaling the amplitude-frequency characteristic of dielectric field fluctuations, a unit for the storage of reference amplitude-frequency characteristics of the multiphase flow and an external PC. At that all four units for measurements of fluctuations of electric and magnetic fields in the multiphase flow are coupled to the common high-frequency scanning signals generator. Each unit for measurements of fluctuations of scanning magnetic field in the multiphase flow via their own third or fourth unit for measurements of amplitude-frequency characteristics is coupled to the second unit for calculating the correlation function. The microprocessor's first input is coupled to the first unit for calculating the correlation function via the scaling unit, the microprocessor's second input is directly coupled to the second unit for calculating the correlation function, the microprocessor's third input is coupled to the unit for the storage of reference amplitude-frequency characteristics of the multiphase flow. The microprocessor output is coupled to the external computer.

The device is equipped with a scanning signal time delay unit which is set in the power supply line connecting the high-frequency scanning signals generator with the units for measurements of fluctuations of electric and magnetic fields in the multiphase flow of the second control section.

Moreover, there is a scanning signal time shift unit in the power supply line of each unit for measurements of fluctuations of the scanning magnetic field in the multiphase flow.

The device can be additionally equipped with temperature and pressure sensors mounted in a measuring section with their outputs coupled to the microprocessor.

With regard to the second embodiment of the invention the device for measurements of total and fractional flow rates of multiphase immiscible media comprises:

two measuring sections that are set apart from each other on a pipeline, each of these measuring sections being equipped with a unit for measurements of fluctuations of dielectric flow characteristics;

a high-frequency scanning signals generator coupled to said measuring units;

the first and the second units for measurements of gain-phase frequency characteristics;

a unit for calculating the correlation function and a control microprocessor.

At that each unit for measurements of fluctuations of dielectric field characteristics is coupled to the unit for calculating the correlation function via its own first or second unit for measurements of gain-phase frequency characteristics.

The invention provides that each measuring section is additionally equipped with a unit for measurements of fluctuations of scanning magnetic field in the multiphase flow, the third and the fourth units for measurements of gain-phase frequency characteristics, the second unit for calculating the correlation function, a scaling unit for the characteristics of dielectric field fluctuations, a unit for the storage of reference multiphase flow characteristics and an external computer. At that, all four units for measurements of fluctuations of electric and magnetic fields in the multiphase flow are coupled to a common high-frequency scanning signals generator. Each unit for measurements of fluctuations of scanning magnetic field in the multiphase flow is coupled to the second unit for calculating the correlation function via its own third or fourth unit for measurements of gain-phase frequency characteristics. The microprocessor's first input is coupled to the first unit for calculating the correlation function via the scaling unit, it is also directly coupled to the second unit for calculating the correlation function. The microprocessor's second input is coupled to outputs of all four units for measurements of gain-phase frequency characteristics. The microprocessor's third input is coupled to the unit for the storage of reference multiphase flow characteristics. The microprocessor's output is coupled to the external computer.

The device can also be equipped with two units for a time delay of recorded signals that come from the first measuring section. One of said units can be set in the channel for measurements of fluctuations of the scanning magnetic field at the output of the corresponding unit for measurements of gain-phase frequency characteristics, the other one can be mounted in the channel for measurements of fluctuations of the dielectric field at the output of the corresponding unit for measurements of gain-phase frequency characteristics.

The device can be equipped with a unit for scanning signal time shift incorporated in the power supply line of each unit for measurements of fluctuations of the scanning magnetic field in the multiphase flow.

The device can be additionally equipped with a unit for a time shift of recorded signals of magnetic field fluctuations that is set at the output of the first unit for calculating the correlation function.

The device can be additionally equipped with temperature and pressure sensors incorporated in one of two measuring sections with their outputs coupled to the microprocessor's fourth input.

The claimed method and the claimed device are based on obtaining additional data on the multiphase flow structure by means of its supplementary scanning in each measuring section by a rotating high-frequency magnetic field with the carrier signal frequency coinciding with the scanning signal frequency of the high-frequency electric field. All four scanning signals are processed independently from each other with identification of peak gain-phase signal characteristics and phase shifts of signals. All four scanning signals are used for calculating the correlation function. A scanning signal recorded at the output of the unit for scanning by the rotating high-frequency electric field is significantly weaker than the output signal from the unit for scanning by the rotating high-frequency magnetic field. To make the signals equal in terms of their contribution to the correlation function, the output signals of the units for scanning the flow by the rotating high-frequency electric field are scaled (signals are amplified by means of a normalizing scale factor). The normalizing factor is calculated experimentally on the basis of laboratory or in-situ measurements. The normalizing factor can also be calculated on the basis of known dependencies.

The use of rotating high-frequency electric and magnetic fields with adjustable carrier frequency in the 1-100 MHz range for flow scanning permits the operations with any multiphase media from gas-liquid flows to flows with dominant water and water solutions content since it covers all possible resonance frequencies in multiphase media.

The scanning signal is recorded in the fixed mode of operation which excludes the impact of transients.

The stepwise change-over of scanning signal carrier frequency with a 50-150 Hz step permits the identification of all distinctive features of variable amplitude-frequency characteristic, including identification of a resonance frequency with an absolute peak amplitude.

To improve the accuracy of measurements by excluding errors related to multiphase media transportation between the control cross-sections of a measuring section, a scanning signal of the high-frequency magnetic field is delivered with a time shift in relation to a scanning signal of the high-frequency electric field.

Taking into account the time it takes a medium to cover the distance between the control sections by the introduction of a corresponding time delay factor makes it possible to reduce workload related to the calculation of the correlation function.

The use of reference characteristics from the database for identification of specific proportions of fractions in the multiphase medium permits prompt determination of fractional proportions by using for the database either reference amplitude-frequency characteristics obtained experimentally in the laboratory or in-situ, or digital values of amplitude-frequency characteristics calculated by using the known formulas.

Temperature and pressure measurements of the multiphase medium provide improved accuracy of determining the fractional composition and flow rates, since these measurements permit taking into account the temperature and pressure variations of the medium dielectric and magnetic characteristics.

To take into account the time it takes the medium to cover the distance between the control sections, the first embodiment of the device, based on the claimed measuring method, is equipped with a time delay unit set in the power supply line that connects the high-frequency scanning signals generator with units for measurements of fluctuations of the electric and magnetic fields in the multiphase flow in the second control section.

To take into account the time it takes the medium to cover the distance between the control sections the second embodiment of the device, based on the claimed measuring method, is equipped with two time delay units for recorded signals that come from the first measuring section, the first unit being set in the channel for measurements of fluctuations of the scanning magnetic field at the output of the corresponding unit for measurements of gain-phase frequency characteristics and the second one being set in the channel for measurements of dielectric field fluctuations at the output of the corresponding unit for measurements of gain-phase frequency characteristics.

Moreover the second embodiment of the device provides improved accuracy of measurements by taking into account a time delay of signals generated by the scanning high-frequency magnetic field in relation to the signals generated by the scanning high-frequency electric field. One or two time delay units are set in the corresponding channels.

BRIEF DESCRIPTION OF THE DRAWINGS

The invention is illustrated by the drawings.

The first embodiment of the device based on the claimed method of measurements of total and fractional flow rates of multiphase immiscible media is schematically presented in FIG. 1.

DETAILED DESCRIPTION OF THE INVENTION

Figure 1:
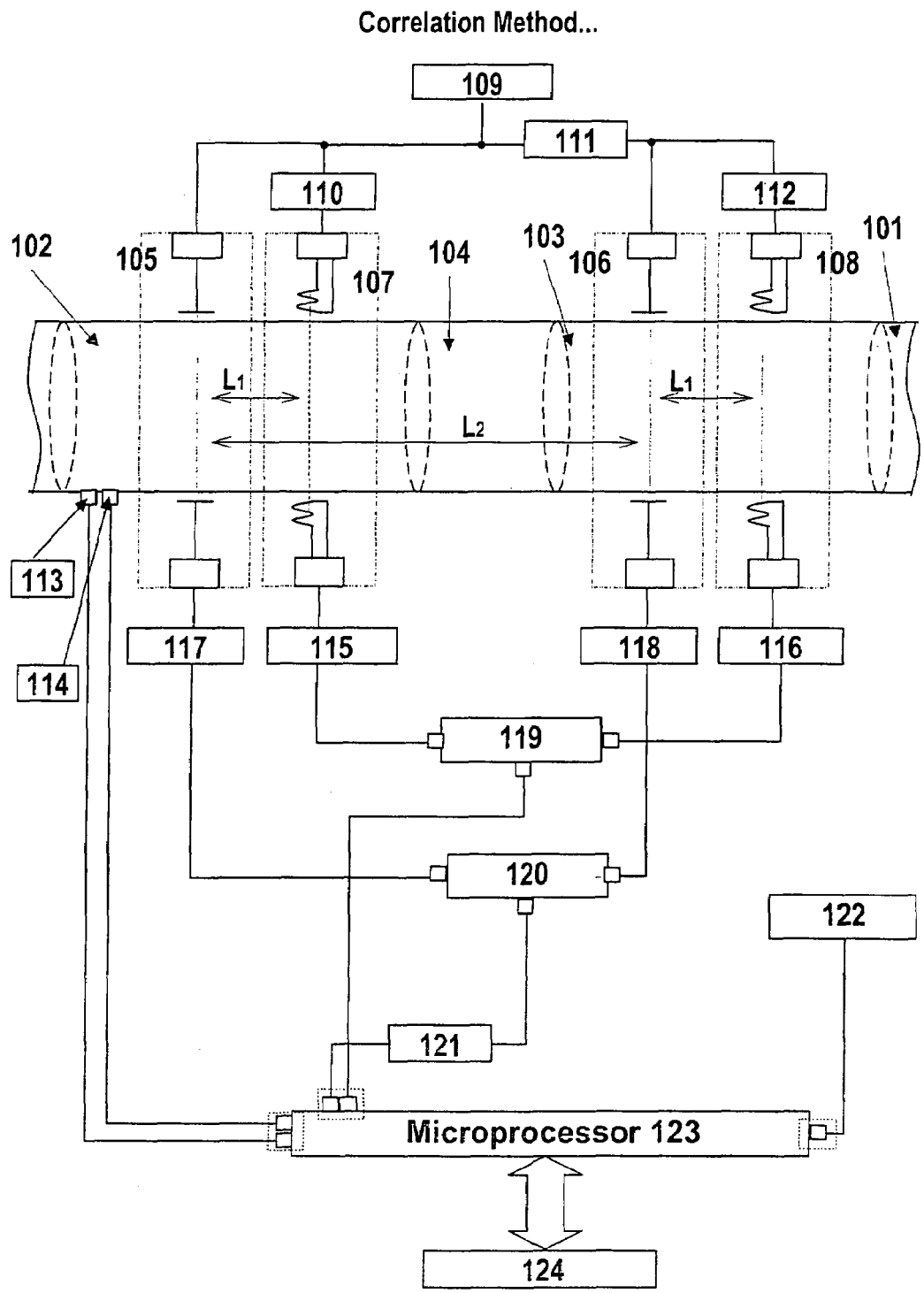

FIG. 1 presents the block-diagram of the first embodiment of the device based on the proposed correlation method of measurements of total and fractional flow rates of multiphase immiscible media.

The device for measurements of total and fractional flow rates of multiphase immiscible media is mounted directly on the pipeline 101 and comprises two measuring sections 102 and 103 located apart from each other along the pipeline. The walls of measuring sections 102 and 103 are made of dielectric material. and there is an insertion 104 placed between said measuring sections. The device comprises two units 105 and 106 for measurements of fluctuations of the flow dielectric characteristics (one unit for each measuring section) that form the rotating electric field for scanning the multiphase medium and record the scanning signal. The device also comprises two units 107 and 108 for measurements of fluctuations of the scanning magnetic field in the multiphase flow that form the rotating magnetic field for scanning the multiphase medium and record the scanning signal. The cross-sections of each measuring section scanned by the high-frequency electric and magnetic fields are shifted in relation to each other at the distance $L_1$. The cross-sections of the measuring sections 102 and 103 scanned by the rotating high-frequency electric or magnetic fields are shifted in relation to each other at the distance $L_2$. The device is equipped with a high-frequency scanning signal generator 109 with its output connected to all four units 105-108 for measurements of fluctuations of the multiphase flow. The unit 105 for measurements of fluctuations of the dielectric flow characteristics in the measuring section 102 is directly connected to the outlet of the generator 109, the unit 107 for measurements of fluctuations of the magnetic field is connected to the outlet of the generator 109 via the scanning signal time shift unit 110. The scanning signal time delay unit 111 is set in the power supply line that connects the generator 109 with the units 106 and 108 for measurements of fluctuations of the multiphase flow in the measuring section 103. There is also an additional scanning signal time shift unit 112 set in the power supply line of the unit 108 for measurements of fluctuations of the magnetic field. The device can be equipped with the temperature sensor 113 and pressure sensor 114, which can be set, for example, in the measuring section 102.

For processing the scanning signals the device comprises four units 115-118 for measurements of the amplitude-frequency characteristics that are analog-digital converters; two units 119 and 120 for calculating the correlation function; the unit 121 for scaling amplitude-frequency characteristic of the dielectric field fluctuations; the unit 122 for the storage of reference amplitude-frequency characteristics of the multiphase flow; the control microprocessor 123 and the external computer 124.

The units 107 and 108 for measurements of the magnetic field fluctuations in the multiphase flow, via their own units 115 and 116 for measurements of amplitude-frequency characteristics, are coupled to the unit 119 for calculating the correlation function. The units 105 and 106 for measurements of fluctuations of dielectric field characteristics are coupled via their own units 117 and 118 for measurements of amplitude-frequency characteristics to the unit 120 for calculating the correlation function. The first input of the microprocessor 123 via the scaling unit 121 is coupled to the unit 120 for calculating the correlation function, whereas the second input of the microprocessor 123 is directly coupled to the unit 119 for calculating the correlation function. The third input of the microprocessor 123 is coupled to the unit 122 for the storage of reference amplitude-frequency characteristics of the multiphase flow. Moreover, the temperature sensor 113 and the pressure sensor 114 are coupled to the microprocessor's inputs. The microprocessor's output is coupled to the external computer 124. The microprocessor 123 is also used to control all device's units (the control links are not shown in the diagram to avoid making it too complicated).

A high-frequency scanning signal generated by the generator 109 is delivered either directly or via the scanning signal time delay unit 111 and the scanning signal time shift units 110 and 112 to the units 105-108 for measurements of fluctuations of the multiphase flow in the measuring sections 102 and 103. The recorded scanning signal of the rotating high-frequency magnetic field from the outputs of the units 107 and 108 is delivered to the units 115 and 116 for measurements of amplitude-frequency characteristics, where the signal is processed with the identification of the resonance frequency with a peak amplitude (amplitude-frequency characteristic of fluctuations of magnetic characteristics of the multiphase medium). The obtained amplitude-frequency characteristic is transmitted to the unit 119 for calculating the correlation function where the resulting correlation function of the magnetic field fluctuations and transportation time delay are determined.

The recorded scanning signal generated by the rotating high-frequency electric field is transmitted from the outputs of the units 105 and 106 to units 117 and 118 for measurements of amplitude-frequency characteristics, where the signal is processed and the resonance frequency with a peak amplitude (amplitude-frequency characteristic of fluctuations of dielectric characteristics of the multiphase medium) is identified. The obtained amplitude-frequency characteristic is transmitted to the unit 120 for calculating the correlation function where the resulting correlation function of fluctuations of dielectric characteristics and transportation time delay are determined.

The resulting correlation functions are transmitted to the control microprocessor 123. The signals from the temperature and pressure sensors are transmitted to the control microprocessor 123 as well. The control microprocessor 123 makes a request for reference amplitude-frequency characteristics of the multiphase medium from the unit 122 and compares the resulting correlation functions with the reference characteristics selecting among them the characteristics that come most closely to the recorded characteristics, The comparison with these characteristics permits a quite accurate identification of fractional proportions of the multiphase flow and the knowledge of the transportation time permits the determination of fractional and total flow rates. The results of the measurements are transmitted to the external computer 124 for permanent storage and analysis.

The measurements of total and fractional flow rates of multiphase immiscible media are carried out as follows.

Two measuring sections are chosen on the pipeline for the transportation of multiphase immiscible media and the flow over two control cross-sections of each measuring section is scanned by the rotating high-frequency electric and magnetic field with one common carrier frequency of the signal. In order to generate a rotating high-frequency electric or magnetic field over the scanned cross-sections, the scanning signal is generated by using two reference high-frequency AC signals shifted at 90° in relation to each other. Said reference signals can be generated either by the generator 109 or directly in the units 105-108.

The scanning signal is a package of discretely modulated high-frequency electric oscillation under voltage, say 2 V, with an adjustable stepwise carrier frequency in the 1-100 MHz range. The value of the step is set by the control microprocessor 123 and can be 50-150 Hz. The scanning signal duration must be sufficient enough to provide measurements over each of four control cross-sections—two control cross-sections in each measuring section. The output signals that reflect the results of the flow scanning have a variable amplitude and a phase shift that depend on the carrier frequency of a scanning signal and multiphase flow fluctuations. The absolute peak amplitude of the output signal will be observed on the resonance frequency, though there might appear occasional peak amplitudes on other frequencies as well. Reference and output signals from the units 105-108 are processed in the units 115-118, each of them being an analog-digital converter. The results of the measurements of the amplitude-frequency characteristic are presented in a digital form. For calculating the correlation function one can use either the whole of the amplitude-frequency characteristic or its area adjacent to the resonance frequency.

The correlation function is calculated in the units 119 and 120 by using any known method of processing two amplitude-frequency characteristics. Simultaneously, the transportation time of the flow between the measuring sections is determined, which subsequently is used in the calculations of total and fractional flow rates of the multiphase medium.

The integral correlation function, which takes into account all four scanning signals, is calculated by the control microprocessor 123. To reduce to one level the scanning signals of the rotating high-frequency electric field and the scanning signals of the rotating high-frequency magnetic field, the sum of scanning signals' amplitudes of the rotating high-frequency electric field is scaled (multiplied by a normalizing factor). The value of the normalizing factor is determined experimentally or calculated. Subsequently the integral correlation function is used for a comparison with reference amplitude-frequency characteristics to determine fractional proportions of the multiphase medium. The fractional proportions of the multiphase medium can also be determined by analyzing the form of amplitude-frequency characteristics and by determining the resonance frequencies, phase shifts, actual and imaginary parts of the complex dielectric constant, actual and imaginary parts of magnetic losses with the use of the known methods and by comparing them with the reference data in the database.

Taking into account that a multiphase medium is transported in the pipeline at a certain speed, all fluctuations of the multiphase medium simultaneously move along at the same speed. Therefore, to achieve higher accuracy of measurements, it is necessary to introduce a time shift between the delivery of scanning signals over two control cross-sections, where the fluctuations of the dielectric characteristics and the magnetic field are measured (for example, it is necessary to have a time shift between the delivery of the signal to the unit 107 in relation to the unit 105). Similarly, it is necessary to introduce a time delay between the delivery of the scanning signal to the measuring section 103 in relation to the measuring section 102.

Figure 2:
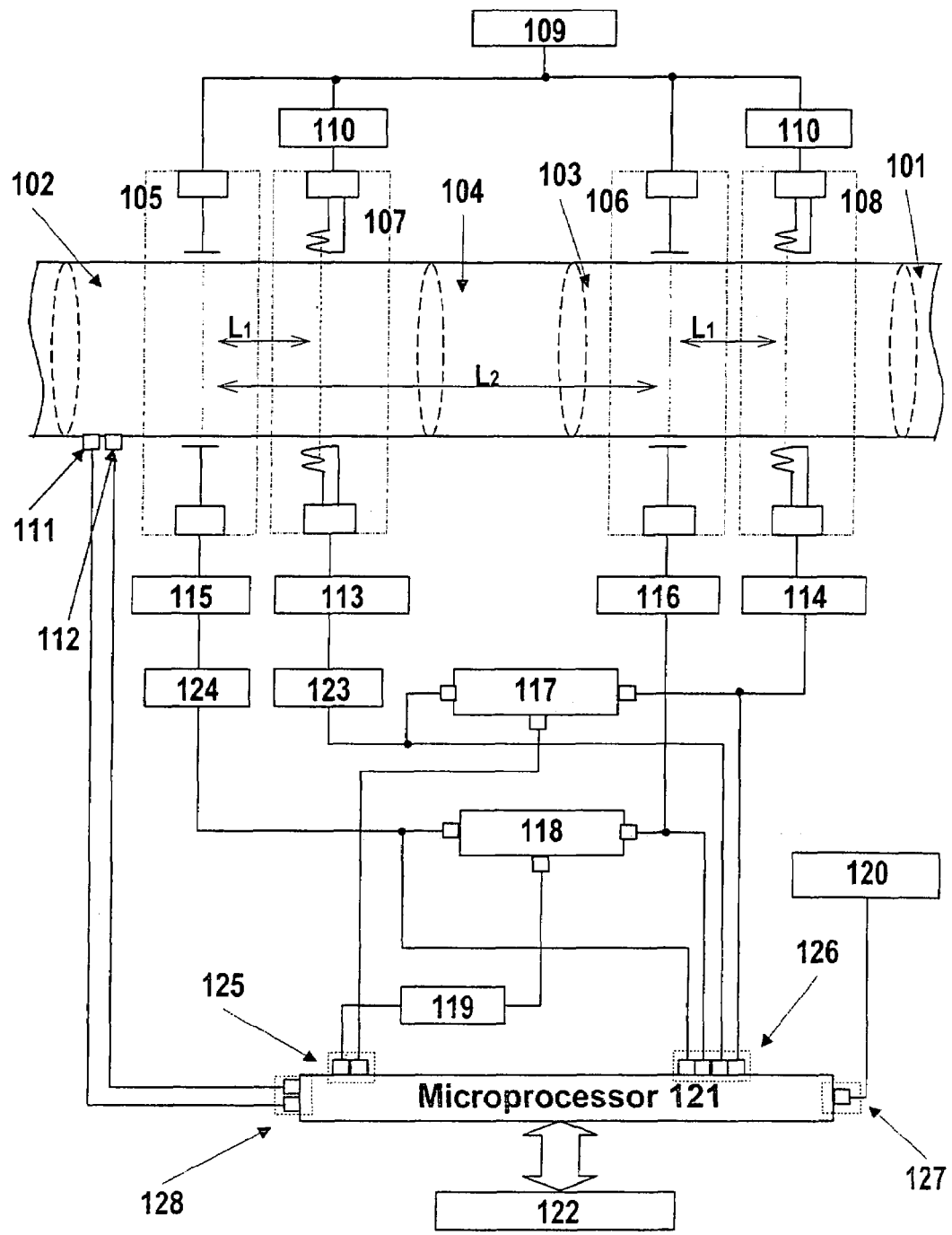
FIGS. 2-4 schematically present three examples of the second embodiment of the device based on the claimed method of measurements of total and fractional flow rates of multiphase immiscible media.
Figure 3:
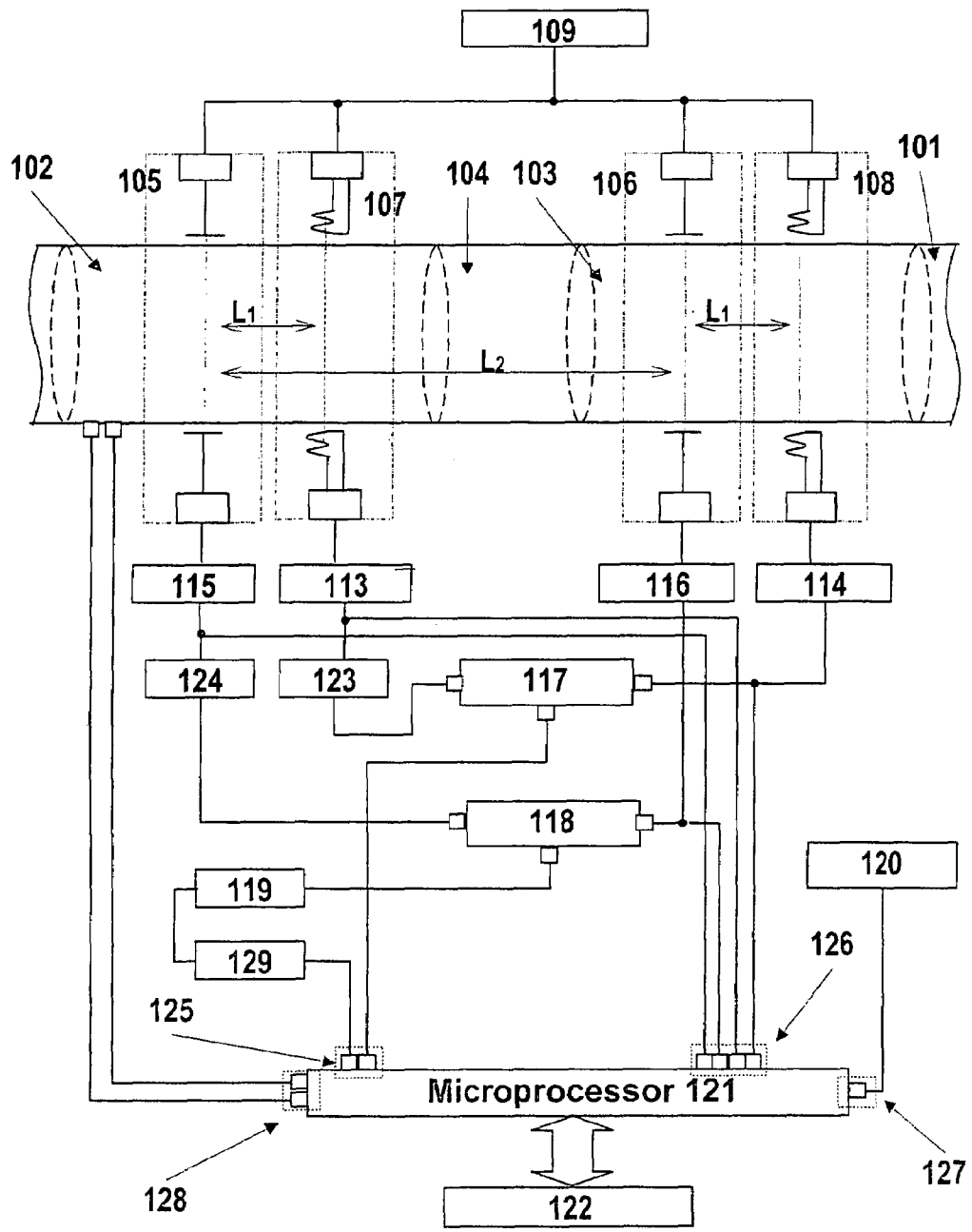
Figure 4:
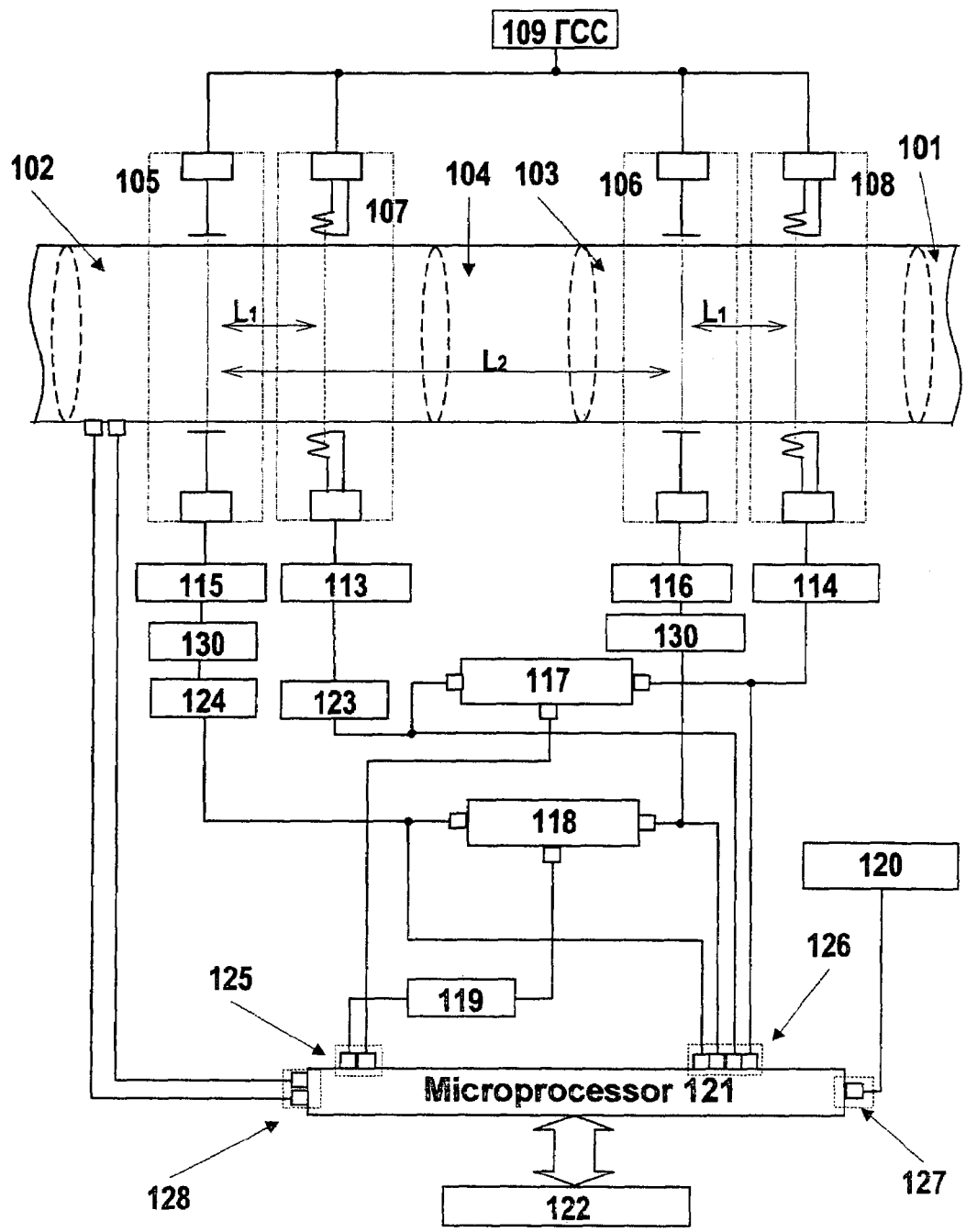

FIGS. 2-4 present three examples of the second embodiment of the device which differ in the location of the time delay unit.

FIG. 2 presents the block-diagram of the first example of the second embodiment of the device, based on the proposed method of measurements of total and fractional flow rates of multiphase immiscible media.

The device for measurements of total and fractional flow rates of multiphase immiscible media is mounted directly on the pipeline 101 and comprises two measuring sections 102 and 103 located apart from each other along the pipeline. The walls of measuring sections 102 and 103 are made of dielectric material, and there is an insertion 104 placed between said measuring sections. The device comprises two units 105 and 106 for measurements of fluctuations of the flow dielectric characteristics (one unit for each measuring section) that form the rotating electric field for scanning the multiphase medium and record the scanning signal. The device also comprises two units 107 and 108 for measurements of fluctuations of the scanning magnetic field in the multiphase flow that form the rotating magnetic field for scanning the multiphase medium and record the scanning signal. The cross-sections of each measuring section scanned by the high-frequency electric and magnetic fields are shifted in relation to each other at the distance $L_1$. The cross-sections of the measuring sections 102 and 103 scanned by the rotating high-frequency electric or magnetic fields are shifted in relation to each other at the distance $L_2$. The device is equipped with a high-frequency scanning signal generator 109 with its output connected to all four units 105-108 for measurements of fluctuations of the multiphase flow. The units 105 and 106 for measurements of fluctuations of the dielectric flow characteristics in the measuring sections 102 and 103 are directly connected to the outlet of the generator 109, whereas the units 107 and 108 for measurements of fluctuations of the magnetic field are connected to the outlet of the generator 109 via the scanning signal time shift unit 110. The device is equipped with the temperature sensor 111 and pressure sensor 112 which can be set, for example, in the measuring section 102.

For processing the recorded scanning signals the device comprises four units 113-116 for measurements of gain-phase frequency characteristics which are analog-digital converters; two units 117 and 118 for calculating the correlation function; the unit 119 for scaling the characteristics of dielectric field fluctuations; the unit 120 for the storage of reference characteristics of the multiphase flow; the control microprocessor 121 and the external computer 122. The unit 120 can be used for the storage of a set of reference characteristics of the multiphase flow: digital images of amplitude-frequency and gain-phase frequency characteristics, a set of reference phase characteristics corresponding to specific proportions of fractions in the multiphase flow, digital values of the complex dielectric constant for each specific ratio between the fractions in the multiphase flow, digital values of magnetic permeability and magnetic losses for each specific ratio between the fractions in the multiphase flow, as well as any other parameters that characterize the multiphase flow.

The units 107 and 108 for measurements of fluctuations of the scanning magnetic field in the multiphase flow are coupled to the unit 117 for calculating the correlation function via their own units 113 and 114 for determination of gain-phase frequency characteristics, whereas the unit 114 is directly coupled to the unit 117 for calculating the correlation function and the unit 113 is coupled to the unit 117 via the time delay unit 123.

The units 105 and 106 for measurements of fluctuations of dielectric field characteristics are coupled to the unit 118 for calculating the correlation function via their own units 115 and 116 for measurements of gain-phase frequency characteristics whereas the unit 116 is directly coupled to the unit 118 for calculating the correlation function and the unit 115 is coupled to the unit 118 via the time delay unit 124.

The first input 125 of the microprocessor 121 via the scaling unit 119 is coupled to the unit 118 for calculating the correlation function and is directly coupled to the unit 117 for calculating the correlation function.

The second input 126 of the microprocessor 121 is coupled to the outputs of all four units 113-116 for measurements of gain-phase frequency characteristics. With the availability of the time delay units 123 and 124 the second input 126 is preferably to be coupled to the outputs of the units 114 and 116 for measurements of gain-phase frequency characteristics via said time delay units but it can also be directly coupled to the outputs of said units as shown in FIG. 3.

The third input 127 of the microprocessor 121 is coupled to the unit 120 for the storage of reference characteristics of the multiphase flow. A specific set of the multiphase flow reference characteristics can be determined individually for each device depending on the characteristics of the well multiphase flow but said complete set of reference characteristics can also be used.

The temperature sensor 113 and the pressure sensor 114 are coupled to the fourth input 128 of the microprocessor 121. The output of the microprocessor is coupled to the external computer 122. The microprocessor 121 is also used to control all devices' units (the control links are not shown in the diagram to avoid making it too complicated).

The high-frequency electric scanning signal generated by generator 109 is transmitted to the units 105-108 for measurements of fluctuations of the multiphase flow in the measuring sections 102 and 103 either directly or via unit 110 for the scanning signal time shift.

The measurements of fractional and total flow rates of multiphase immiscible media are conducted in the following way:

Two measuring sections are placed on the pipeline for transportation of multiphase immiscible media and the flow over two control cross-sections of each measuring section is scanned by rotating high-frequency electric and magnetic fields with one common signal carrier frequency. In order to generate a rotating high-frequency electric or magnetic field over the scanned cross-sections, the scanning signal is generated by using two reference high-frequency AC signals shifted at 90° in relation to each other. These reference signals can be generated either by the generator 109 or directly in the units 105-108.

The scanning signal is a package of discretely modulated high-frequency electric oscillation under voltage, say 2 V, with an adjustable stepwise carrier frequency in the 1-100 MHz range. The value of the step is set by the control microprocessor 121 and can be 50-150 Hz. The scanning signal duration must be sufficient enough to provide measurements in each of four control cross-sections—two control cross-sections in each measuring section. The recorded (output) signals that reflect the results of the flow scanning have a variable amplitude and phase shift that depend oil the scanning signal carrier frequency and multiphase flow fluctuations. The absolute peak amplitude of the output signal will be observed on the resonance frequency, though there might appear occasional peak amplitudes on other frequencies as well. For calculating the correlation function one can use either the whole of the gain-frequency characteristic or its area adjacent to the resonance frequency.

Taking into account that a multiphase medium is transported in the pipeline at a certain speed, all fluctuations of the multiphase medium simultaneously move along at the same speed. Therefore, to achieve higher accuracy of measurements, it is necessary to introduce a time shift between the delivery of scanning signals over two control cross-sections, where the fluctuations of the dielectric characteristics and the magnetic field are measured (for example, it is necessary to have a time shift between the delivery of the signal to the unit 107 in relation to the unit 105).

The recorded scanning signal generated by the rotating high-frequency magnetic field is delivered from outputs of the units 107 and 108 to the units 113 and 114 for measurements of gain-phase frequency characteristics, where the signal is digitized and processed with the identification of the resonance frequency with the peak amplitude (amplitude-frequency characteristic of fluctuations of the multiphase media magnetic characteristics). The phase shift in relation to the initial scanning signal—the gain-phase characteristic of the multiphase medium fluctuations—is determined as well. The processing results are transmitted to the unit 117 for calculating the correlation function and to the second input 126 of the microprocessor 121. The unit 117 is used to determine the resulting correlation function of the magnetic field fluctuations and the time of the transportation delay. The procedure for calculating the correlation function in the unit 117 does not differ from standard procedures and provides for the multiplication of two signals with their subsequent summation, for example, consecutive summation of the products with identification of the maximum value. The digital signal can be delivered from the unit 113 for measurements of gain-phase frequency characteristics to the unit 117 for calculating the correlation function either directly or via the time delay unit 123. A specific time delay value (transportation time) is determined by the microprocessor 121 according to the results of the first measurements and transmitted to the time delay unit 123. Then the time delay value is corrected depending on the results of current measurements.

The recorded scanning signal generated by the rotating high-frequency electric field is transmitted from the outputs of the units 105 and 106 to the units 115 and 116 for measurements of gain-phase frequency characteristics, where the signal is digitized and processed with the identification of the resonance frequency with the peak amplitude—amplitude-frequency characteristic of fluctuations of multiphase medium dielectric characteristics. The phase shift in relation to the initial scanning signal—the gain-phase characteristic of the multiphase medium fluctuations—is determined as well. The processing results are delivered to the unit 118 for calculating the correlation function and to the second input 126 of the microprocessor 121. The unit 118 is used to determine the resulting correlation function of the dielectric fluctuations characteristics of the multiphase medium and the time of the transportation delay. The procedure for calculating the correlation function in the unit 118 does not differ from the procedure used in the unit 117. The digital signal can be delivered from the unit 115 for measurements of gain-phase frequency characteristics to the unit 118 for calculating the correlation function either directly or via the time delay unit 124. A specific time delay value (transportation time) is determined by the control microprocessor 121 depending on the results of the first measurements and transmitted to the time delay unit 124. Then the time delay value is corrected depending on the results of current measurements.

The resulting correlation functions are transmitted to the control microprocessor 121 which also receives the signals from the temperature sensor 111 and the pressure sensor 112 as well as digital signals from the units 113-116 for measurements of gain-phase frequency characteristics.

The control microprocessor 121 can use a variety of procedures for processing the received signals.

According to the first procedure the control microprocessor 121 requests the unit 120 to deliver the data related to the reference characteristics of the multiphase flow and compares the resulting correlation functions with the reference data selecting the values that resemble the measured characteristics most closely. This comparison permits the determination of the fractional composition of the multiphase flow with a high degree of accuracy. The information about the transportation time permits the determination of fractional and total flow rates. Either amplitude-frequency and gain-phase characteristics or the integral correlation function, that takes into account all four signals, can be compared with the reference data. The integral correlation function that takes into account all four scanning signals is calculated by the control microprocessor 121. To reduce the scanning signals generated by the rotating high-frequency electric field and the scanning signals generated by the rotating high-frequency magnetic field to one level, the sum of amplitudes of scanning signals generated by the rotating high-frequency electric field is scaled (multiplied by a normalizing factor). The value of the normalizing factor is determined experimentally or calculated. The results of the measurements are transmitted to the external computer 122 for permanent storage and analysis.

According to the second procedure the control microprocessor 121 processes digital results of processing amplitude-frequency and gain-phase characteristics received from the units 113-116. The fractional composition of the multiphase medium can be determined by analyzing the form of amplitude-frequency characteristics and by determining with the use of the known methods the resonance frequencies, phase shifts, actual and imaginary parts of the complex dielectric constant, actual and imaginary parts of magnetic losses and by comparing them with the data in the database. The results of the measurements are transmitted to the external computer 122 for permanent storage and analysis.

The second example of the second embodiment of the device as demonstrated in FIG. 3 is distinguished from said first embodiment of the device in that instead of two units 110 for the scanning signal time shift the device is equipped with one unit 129 for time shift of recorded signals of the fluctuations of the muliphase flow dielectric characteristics. The unit 129 is set at the output of, the unit 118 for calculating the correlation function after the scaling unit 119.

The third example of the second embodiment of the device as demonstrated in FIG. 4 is distinguished from said first embodiment of the device in that instead of two units 110 for the scanning signal time shift the device is equipped with two units 130 for time shift of recorded signals of the fluctuations of the muliphase flow dielectric characteristics. Said units are correspondingly set at the outputs of the units 115 and 116 for measurements of gain-phase frequency characteristics.

The procedures for measurements of total and fractional flow rates of multiphase immiscible media when the second and the third embodiments of the device are used basically coincide with the above method for measurements of total and fractional flow rates as described for the first embodiment of the device. They differ from each other in the correction that takes into account the time shift of measurements of the magnetic field fluctuations in relation to dielectric field fluctuations that occur in each measuring section. In case of the second embodiment of the device the time shift correction is effected at the output of the unit 118 for calculating the correlation function of fluctuations of the multiphase dielectric characteristics. As regards the third embodiment of the device the time shift correction is effected at the outputs of the corresponding units 115 and 116 for measurements of gain-phase frequency characteristics of fluctuations of the multiphase flow dielectric characteristics.

It is quite obvious that the proposed invention can be embodied in a variety of modifications and options. The invention can be used on the pipelines of any diameter and with any cross-section form (circular, square, rectangular, etc.). Accordingly, it is assumed that the invention covers all said modifications and options, as well as their equivalents, without departing from the spirit of the invention and its scope, as disclosed by the claims hereof.

What is claimed is:

1. A correlation method for measurements of total and fractional flow rates of multiphase immiscible media comprising:
   identifying two control sections located on a pipeline at a fixed distance from each other;
   scanning the flow in said control sections by a rotating high-frequency electrical field with measuring a fluctuation of the dielectric characteristics of the flow in each of the control sections and subsequent processing of the signals scanned by the electrical field for identifying an area having a pick amplitude, and further calculating of a correlation function of said processed signals scanned by the electrical field;
   scanning the flow in said control sections by a rotating high-frequency magnetic field having a signal with the same carrier frequency as the scanning frequency of the rotating high-frequency electrical field with measuring a fluctuation of the magnetic field in each of the control sections and subsequent processing of the signals scanned by the magnetic field for identifying an area having a pick amplitude, and further calculating of a correlation function of said processed signals scanned by the magnetic field;
   measuring time of a flow transportation at a pick of the correlation function of the scanned signals;
   calculating an integral correlation function by using the results of the calculation of said two correlation functions, while an amplitude of the signals scanned by the electrical field or sum of the amplitudes of said two signals are scaled by aligning them in relation to signals scanned by the magnetic field;
   determining summary volume of the flow rate by using a measured time of a flow transportation; and
   comparing said two correlation functions of the processed signals scanned by the electrical and magnetic fields and of the integral correlation function with the correlation functions determined for the standardized characteristics in a database and selecting in said database the correlation characteristics having the most similar values to said processed signals, and determination of fractional portions of multiphase medium in the control section.

2. The method of claim 1, wherein the scanning of the flow is conducted by using the high-frequency electrical and magnetic fields having an adjustable carrier frequency of the signals in a range of 1-100 MHz.

3. The method of claim 2, wherein the carrier frequency of the scanned signal is stepwise altered and the signal is recorded in a fixed mode at each frequency.

4. The method of claim 3, wherein the frequency of the scanned signals is changed in 50-150 Hz steps upon going over into the next carrier frequency of the scanning.

5. The method of claim 1, wherein the signal scanned by the magnetic field is delivered with a time shift which is equal to a time transportation of the medium between control cross-sections scanned by the electrical and magnetic fields.

6. The method of claim 1, wherein the time transportation of the medium between the control sections is recorded and further scanning of the flow in the second control section is effected by the scanning signals delivered with a time delay which takes into account said time transportation.

7. The method as in any one of claims 1-6, further comprising the step of measuring the temperature and the pressure of the multiphase medium in at least one of the control sections.

8. A device for measurements of total and fractional flow rates of multiple immiscible media, comprising:
   two measuring sections which are set apart from each other on a pipeline, each of said sections being equipped with a unit for measuring fluctuations of dielectric flow characteristics and with a unit for measuring fluctuations of scanning magnetic field in multiphase flow;
   a high-frequency scanning signal generator coupled with said units for measuring fluctuations;
   four units for determining amplitude-phase frequency characteristics to process recorded signals generated by said units for measuring fluctuations, said units for measuring fluctuations of the scanning magnetic field being coupled with the first and the second units, respectively, for determining amplitude-phase frequency characteristics, while said units for measuring fluctuations of dielectric flow characteristics are coupled with the third and the fourth units for determining amplitude-phase frequency characteristics;
   two units for calculating a correlation function of recorded signals, the first and the second units for determining amplitude-phase frequency characteristics being coupled with the first unit for calculating a correlation function, and the third and the fourth units for determining amplitude-phase frequency characteristics being coupled with the second unit for calculating a correlation function;
   a controlling microprocessor for processing the results of measurement and comparing them with standardized characteristics, while a first input of the microprocessor is coupled with the first unit for calculating the correlation function via a scaling unit and a second input of the microprocessor is coupled with the second unit for calculating the correlation function; and
   a unit for storing the standardized characteristics coupled with a third input of the microprocessor for sending therein said characteristics and comparing them with the results of measurement.

9. The device of claim 8, further comprising a time delay unit of the scanning signal mounted in a power supply line connecting the high-frequency scanning signal generator to the units for measuring of fluctuations of dielectric flow characteristics and the fluctuation of the magnetic field in the multiphase flow in the second measuring section.

10. The device of claim 8, further comprising two time shift units of the scanning signal mounted in a power supply line of each unit for measuring the fluctuation of the magnetic field in the multiphase flow.

11. The device of claim 8, further comprising temperature and pressure sensors mounted in a power supply line of one of the measuring sections, said sensors being coupled with a fourth input of the microprocessor.

12. The device of claim 8, further comprising an external computer for continuous storage and analysis of the measuring results, said computer being coupled with the output of the microprocessor.

13. A correlation method for measurements of total and fractional flow rates of multiphase immiscible media comprising:
   identifying two control sections located on a pipeline at a fixed distance from each other;
   scanning the flow in said control sections by a rotating high-frequency electrical field with measuring a fluctuation of dielectric characteristics of the flow in each control section and subsequent processing of the signals scanned by the electrical field for identifying an area having a pick amplitude and further calculating of a correlation function of said processed scanned signals;
   scanning the flow in said control sections by a rotating high-frequency magnetic field having a signal with the same carrier frequency as the scanning frequency of the rotating high-frequency electrical field with measuring a fluctuation of the magnetic field in each control section and subsequent processing of the signals scanned by the magnetic field for identifying an area having a pick amplitude and further calculating of a correlation function of said processed scanned signals;
   measuring time of a flow transportation at a pick of the correlation function of the scanned signals;
   calculating an integral correlation function by using the results of calculation of said two correlation functions, while an amplitude of the signals scanned by the electrical field or sum of the amplitudes of said two signals are scaled by aligning them in relation to signals scanned by the magnetic field;
   comparing said two correlation functions of the processed signals scanned by the electrical and magnetic fields and of the integral correlation function with the correlation functions determined for the standardized characteristics in a database with further selecting in said database the correlation characteristics having the most similar values to said processed signals;
   determining resonance frequencies and phase shifts of the signals scanned by the electrical and magnetic fields, actual and imaginary components of a complex dielectric constant, actual and imaginary components of magnetic losses by using measured amplitude-frequency characteristics, comparing the resulting values with the standardized characteristics in the database to identify the signal with the most similar parameters, and calculating fractional portions of the selected components of the multiphase medium;
   determining summary volume of the flow rate by using a measured time of a flow transportation; and
   determining fractional portions of the multiphase medium in the control sections by using the characteristics picked-out from a database, and subsequent determination of the fractional rates of multuphase flow by specifying the summary volume and the fractional portions.

14. The method of claim 13, wherein the scanning of the flow is conducted by using the high-frequency electrical and magnetic fields having an adjustable carrier frequency of the signals in a range of 1-100 MHz.

15. The method of claim 13, wherein the carrier frequency of the scanned signal is stepwise altered and the signal is recorded in a fixed mode at each frequency.

16. The method of claim 13, wherein the frequency of the scanned signals is changed in 50-150 Hz steps upon going over into the next carrier frequency of the scanning.

17. The method of claim 13, wherein the signal scanned by the magnetic field is delivered with a time shift which is equal to a time transportation of the medium between control cross-sections scanned by the electrical and magnetic fields.

18. The method of claim 13, wherein the signals with the amplitude-phase frequency characteristics of fluctuating dialectical characteristics are sent for calculation of the correlation function with a time shift which is equal to a time transportation of the medium between control cross-sections scanned by the electrical and magnetic field, and at the current measurements of the total and fractional flow rates.

19. The method of claim 13, wherein the correlation function of the recorded signals scanned by the magnetic field is delivered for further processing with a time shift which is equal to a time transportation of the medium between the control cross-sections scanned by the electrical and magnetic fields.

20. The method of claim 13, wherein the time transportation of the medium between the control sections is recorded and signals with amplitude-phase frequency characteristics of the first measuring section are delivered for calculation of the respective correlation functions with a time delay which takes into account said time transportation, and at the subsequent current measurements of the total and fractional flow rates.

21. The method as in any one of claims 13-20, further comprising measuring the temperature and the pressure of the multiphase medium in at least one of the control sections.

22. A device for measurements of total and fractional flow rates of multiple immiscible media, comprising:
- two measuring sections that are set apart from each other on a pipeline, each of which is equipped with a unit for measuring fluctuations of dielectric flow characteristics and with a unit for measuring fluctuation of scanning magnetic field in multiphase flow;
- a high-frequency scanning signal generator coupled to said units for measuring fluctuations;
- four units for determining amplitude-phase frequency characteristics to process recorded signals generated by said units for measuring fluctuations, said units for measuring fluctuations of the scanning magnetic field being coupled with the first and the second units, respectively, for determining amplitude-phase frequency characteristics, while said units for measuring fluctuations of dielectric flow characteristics are coupled with the third and the fourth units for determining amplitude-phase frequency characteristics;
- two units for calculating a correlation function of recorded signals, the first and the second units for determining amplitude-phase frequency characteristics being coupled with the first unit for calculating a correlation function, and the third and the fourth units for determining amplitude-phase frequency characteristics being coupled with the second unit for calculating a correlation function;
- a controlling microprocessor for processing the results of measurement and comparing them with standardized characteristics, while a first input of the microprocessor is coupled with the first unit for calculating a correlation function via a scaling unit and a second input of the microprocessor is coupled with the second unit for calculating a correlation function; and
- a unit for storing the standardized characteristics coupled with a third input of the microprocessor for sending therein said characteristics and comparing them with the results of measurements.

23. The device of claim 22, further comprising two time delay units of the recorded signals coming from the first measuring section, a first of said time delay units being coupled with the output of the first unit for determining amplitude-phase frequency characteristics and a second of said time delay units being coupled with the output of the third unit for determining amplitude-phase frequency characteristics.

24. The device of claim 22, further comprising two time shift units of the scanning signal, said units being mounted in a power supply line of each unit for measuring the fluctuation of the magnetic field in the multiphase flow.

25. The device of claim 22, further comprising a time shift unit of the signals, said unit being mounted in a sequence with the scaling unit.

26. The device of claim 22, further comprising two time shift units of the signals recording fluctuations of the dielectric characteristics of the multiphase flow, said time shift units being coupled with the outputs of said first and second units for determining amplitude-phase frequency characteristics.

27. The device of claim 22, further comprising a temperature sensor and a pressure sensor mounted in a power supply line of one of the measuring sections, said sensors being coupled with a fourth input of the microprocessor.

28. The device of claim 22, further comprising an external computer for continuous storage and analysis of the measuring results, said computer being coupled with the output of the microprocessor.

* * * * *